United States Patent [19]

Van Gilder et al.

[11] 3,868,327
[45] Feb. 25, 1975

[54] FILTER UNIT FOR FLUID CLEANER

[75] Inventors: James F. Van Gilder, Addison, Tex.;
Donald R. Schmidt, Worthington, Minn.

[73] Assignee: Skyway Sales Corporation, Lake Perry, Kans.

[22] Filed: Mar. 12, 1973

[21] Appl. No.: 339,992

[52] U.S. Cl. ............................ 210/457, 210/488
[51] Int. Cl. ................................... B01d 25/04
[58] Field of Search ........................ 210/457, 488

[56] References Cited
UNITED STATES PATENTS

| | | | |
|---|---|---|---|
| 1,930,209 | 10/1933 | Milkey | 210/488 X |
| 3,160,588 | 12/1964 | Alarie | 210/488 X |
| 3,223,241 | 12/1965 | Kasten | 210/488 X |
| 3,375,931 | 4/1968 | Sorenson | 210/488 x |
| 3,550,777 | 12/1970 | Singleton | 210/488 X |
| 3,563,388 | 2/1971 | Briggs | 210/488 X |

*Primary Examiner*—Charles N. Hart
*Assistant Examiner*—Richard W. Burks

[57] ABSTRACT

A filter unit includes a toroid made up of flat disc-shaped layers of absorbant tissue paper such as toilet paper stacked one on top of the other; a cylindrical core extending up through the center opening of the toroid, having openings therethrough for the passage of the fluid being cleaned, and spaced from the interior surface of the paper; and impervious end plates in sealing relation to the two spaced apart parallel outer end surfaces of the toroid. The tensioning between all adjacent tissue paper layers is accurately controlled to insure that a proper filtering action will be achieved in accordance with the nature of the fluid being filtered, the nature of the impurities, the rate of flow, and the permissible pressure loss through the fluid cleaner and other factors. This tensioning is achieved at the point of initial manufacture of the filter unit by accurately controlling the thickness and number of layers of filter paper used and the positioning and tensioning of the impervious end plates when they are fixedly mounted with respect to the filter paper toroid and with respect to the pervious core or a pervious outer cylindrical casement. The filter unit is assembled in the cannister of a fluid cleaner so that the flow of fluid is to the entire outer periphery of the filter paper toroid, radially inwardly to the hollow center of the toroid, and out through the cylindrical pervious center core.

9 Claims, 6 Drawing Figures

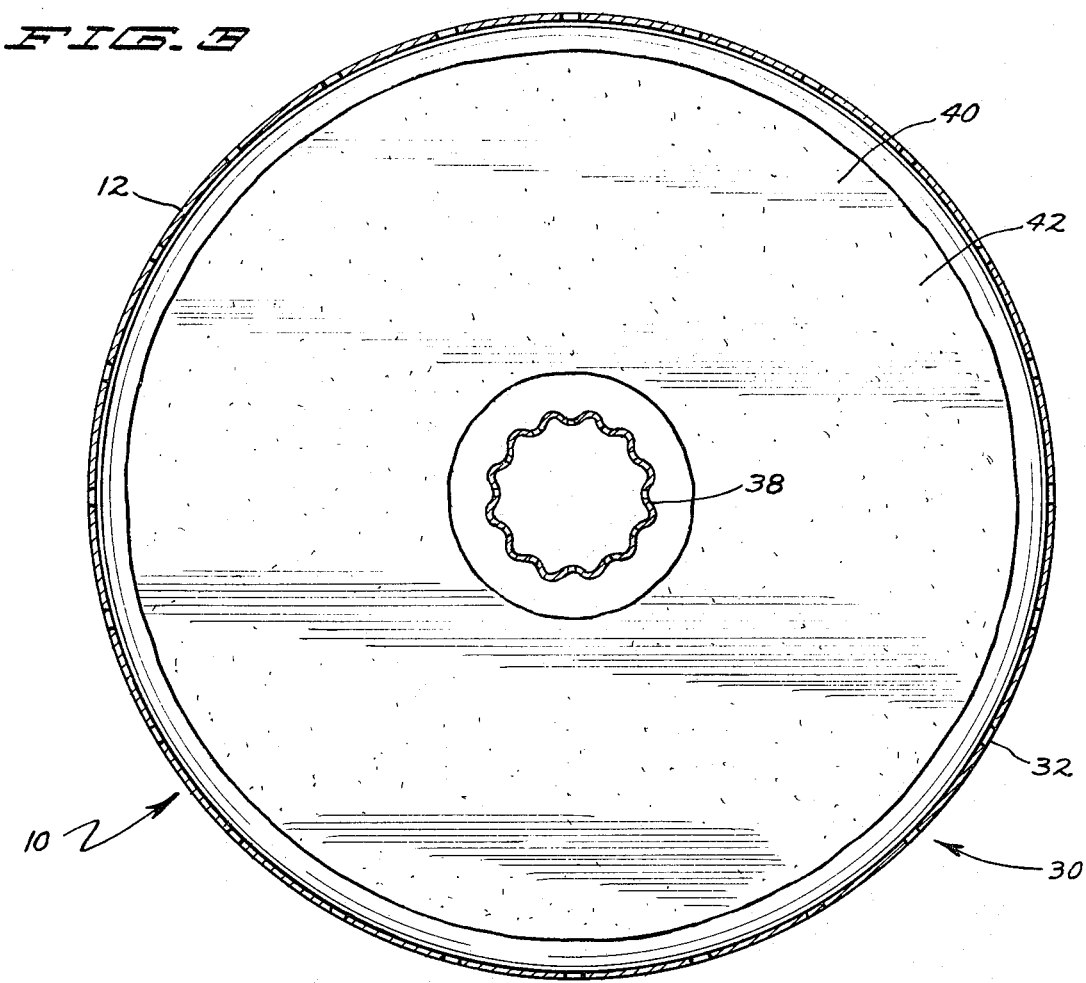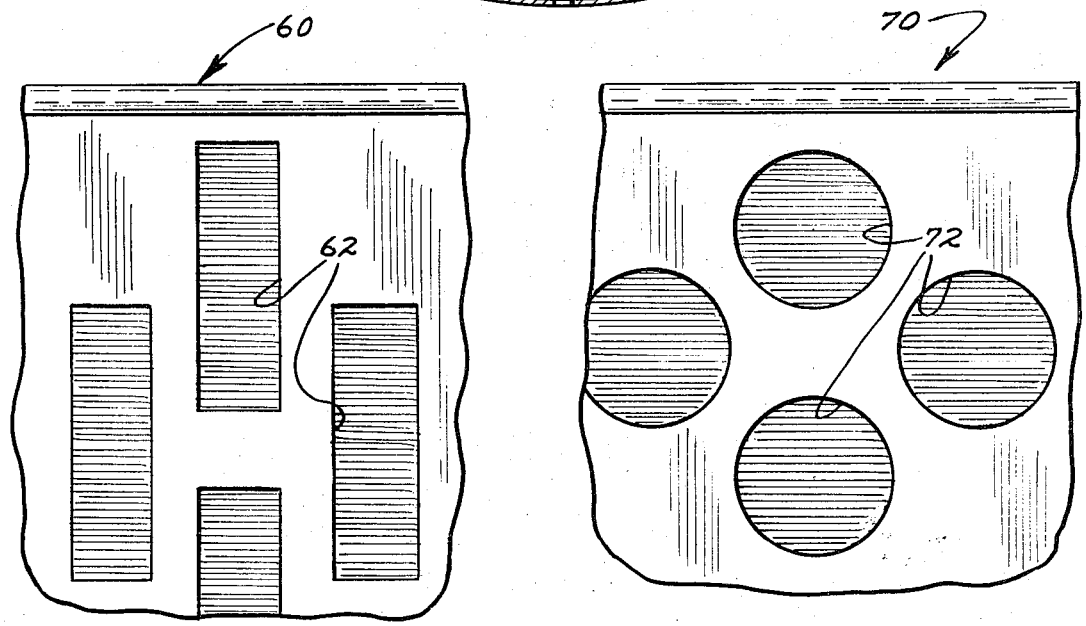

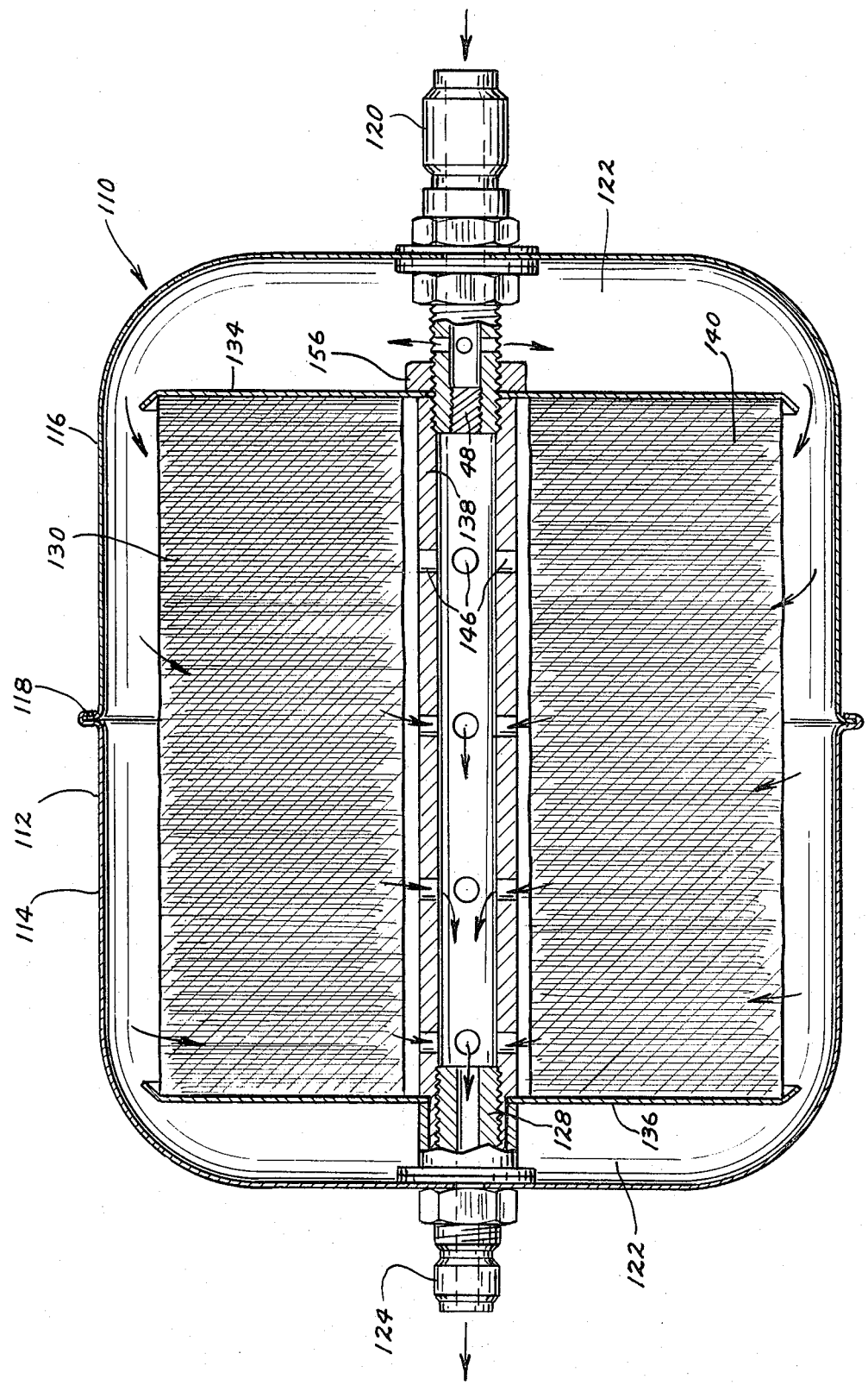

FILTER UNIT FOR FLUID CLEANER

BACKGROUND OF THE INVENTION

This invention has relation to the filtration of deleterious materials from fluids such as lubricating oil, fuel oil, hydraulic fluid, air used for air-conditioning, air coming from industrial machines and which can include entrained particles of abrasive materials used for sandblasting, for example, etc., etc.

It is well known to filter oil through the end edges of a toilet paper roll. See U.S. Pat. No. 3,308,956 and U.S. Pat. No. 2,547,857. A major difficulty with these structures has been control over the tensioning between the individual layers of the paper. In fact, in the structure shown in U.S. Pat. No. 3,308,956, it is contemplated that the user of the filter, typically the average home automobile owner, will select his own toilet paper roll to position on the filter unit when the initially supplied roll has served its purpose and is saturated with the materials being filtered from the oil. The variation in the performance of the filter under conditions of too much paper on the roll, just the right amount of paper on the roll, and not enough paper on the roll is tremendous and substantial inefficiencies in the use of such filters is readily apparent.

Following the development of the downflow filter as shown in U.S. Pat. No. 2,547,857, where the oil flow is longitudinally along parallel to the axis of a cylindrical filter element; use of similar elements having impervious end plates and pervious cylindrical side walls and center cores was developed. An early form of this idea is seen in U.S. Pat. No. 2,079,475 while a later form thereof is seen in U.S. Pat. No. 3,561,602. Each of these patents provides coil spring means for tensioning the layers of filter paper by urging the impervious end plates in direction toward each other. Each anticipates replacement of the filter elements "in the field."

The importance of regulating axial compression in such a filter is recognized by the patent to Kasten, U.S. Pat. No. 3,207,311. However, Kasten merely provides a dynamic arrangement whereby the outlet pressures on his "hollow compressible filter element" are balanced against each other, thus limiting the compressive forces to those created by a tension spring forcing the end plates toward each other in the manner shown and previously mentioned in U.S. Pat. No. 3,561,602, for example.

Outer to inner surface filtering through cylindrical filter units is also accomplished by positioning bulk packed filter materials between inner generally cylindrical pervious cores and outer cylindrical pervious casements. Such filter materials, in use today, include packed sisal, shredded newsprint, oat hulls, wood chips, papermache, charcoal, etc. A major difficulty is the lack of homogeneity in the makeup of the filter material. This manifests itself as voids in the filter material when it was originally packed, as shrinkage and settling when stored for long periods under adverse conditions, and in actual breakdown, physical and/or chemical of the filter materials during use thereof in filtration.

Furthermore, this use of "bulk" materials necessitates the use of very tiny and/or sophisticated shaping of the holes in the center core and in the outer casement in order to prevent loss of appreciable quantities of the filter medium during use and/or during storage and transportation. This necessary use of small openings and intricately shaped openings results in an appreciable number of such openings being blocked or at least partially blocked during use, thus severely cutting the efficiency of the filter unit. Furthermore, use of an outer casement having small openings or intricate openings prevents the viewing of the outer surface of the filter elements to determine visually the extent to which deleterious materials has collected on this outer surface.

While the system utilizing the outer cannisters and inner center cores with small openings, and utilizing "bulk" filter mediums have been successfully operated with the axis of the cylinder lying in a horizontal plane, horizontal operation of the device of the prior art where filter papers stacked face to face and held in tension by impervious end plates urged toward each other by spring means has proved unsatisfactory, as the forces on the bottom edges of the filter papers are not the same as the forces on the top edges thereof so filtering will not be uniform.

BRIEF SUMMARY OF THE INVENTION

The filter unit of the present invention is designed and manufactured to overcome the deficiencies in the prior art. The proven advantages of filtering along the edges of face to face sheets of tissue paper such as toilet paper are utilized by stacking identically sized, disc-shaped flat sheets of filter paper of facial tissue or toilet paper quality in face to face relationship to each other around a pervious central core of generally cylindrical configuration; by placing impervious end plates in sealing relation to the end sheets at each end thereof; by very carefully regulating the pressure between adjacent sheets by regulating the pressure exerted on the end plates; and then by fastening these rigid end plates fixedly with respect to each other either to the pervious center core or to a pervious outer casement, or to both.

In one form of the invention as shown, the appearance of the outer casement and of the inner core can be identical with that of filter units used in similar fluid cleaners, where the filter medium is a "bulk" mater. In such units, the openings through the outer casement and the center core will be relatively small.

In another embodiment of the invention, the advantages of rigidity of construction can be retained by continuing to use a pervious outer casement, but the openings through that casement can be large enough to permit viewing of relatively large areas of the outer surface of the laminated tissue paper toroid. In such a structure, it is possible to visually identify very minute quantities of deleterious materials which are being picked up and retained at the outer surface of the filter medium. For example, breakdown of metal parts in the engine of an automotive vehicle can be almost immediately detected in the form of very minute particles of oil entrained metal which are deposited on the outer surface of the filter medium.

In yet another embodiment of the invention, the impervious end plates can be made with sufficient rigidity so that fastening them only to the center core will result in uniform tensioning of the filter medium such that it is unnecessary to provide an outer casement. Obviously, the entire outer surface of such a filter medium is immediately viewable when the medium is removed from the cleaner cannister to replace it or to see if it needs replacement. The positive positioning of the end plates to put uniform pressure on adjacent face to face filter papers is such that there is no discernible change in pressure whether the unit is situated with the central axis of the toroid in a vertical position or in a horizontal position or somewhere in between.

While oil flows of the volume to be useful in filtering the lubrication systems of private automobiles lend themselves to use of filters employing toilet paper rolls with the fluid flow longitudinally from the top to the bottom of the roll parallel to the axis thereof; the flow volumes necessary to successfully filter the lubrication systems of large automotive vehicles such as trucks must be handled by units of the character and size of the present invention. By way of comparison, the units of the present invention have been effective in stopping particles of 0.07 microns in size. The end pressure to achieve the proper tension between adjacent face to face filter papers will very considerably depending on the nature of the fluid to be filtered, but pressures on the order of 25 to 30 pounds exerted on end plates which are approximately 6 inches in diameter, but good results have been obtained using pressures from 3 pounds to 60 pounds.

This accurate control over the end pressures makes it possible to manufacture units which substantially fill cleaner cannisters of typical 55 gallon drum size and greater and to make filters down to the size of the traditional toilet paper roll or less. When air or other gas is filtered, a controlled filter of the present invention will take the moisture from the air; while filters working on fuel oil, hydraulic oil, and the like will pick up any water therein.

On a typical installation, where the end plates and filter papers are substantially 6 inches in diameter and the cannister is in the neighborhood of 7 ½ inches in diameter and about 18 inches high, flow rates of about two gallons per minute will be obtainable and satisfactory.

Units of the same size and with substantially the same flow rate but using "bulk" filter mediums require oil changes every six to ten thousand miles as well as changes in filter elements. Tests indicate that units made in accordance with the invention will need to be changed only about every 25,000 miles, with no need for oil change.

IN THE DRAWINGS

FIG. 3 is a horizontal sectional view taken on the line 3—3 in FIG. 2;

FIG. 4 is an enlarged fragmentary sectional view of an outer portion of the filter unit casement showing a modified form of openings therethrough and showing the outer cylindrical surface of the filter medium as it appears through such openings;

FIG. 5 is an enlarged fragmentary elevational view of an outer portion of the filter unit casement showing yet a further modification in the shape of the openings therethrough; and FIG. 6 is a vertical sectional view of a modified form of fluid cleaner showing a modified form of filter unit.

DESCRIPTION OF PREFERRED EMBODIMENTS

Figure 1:
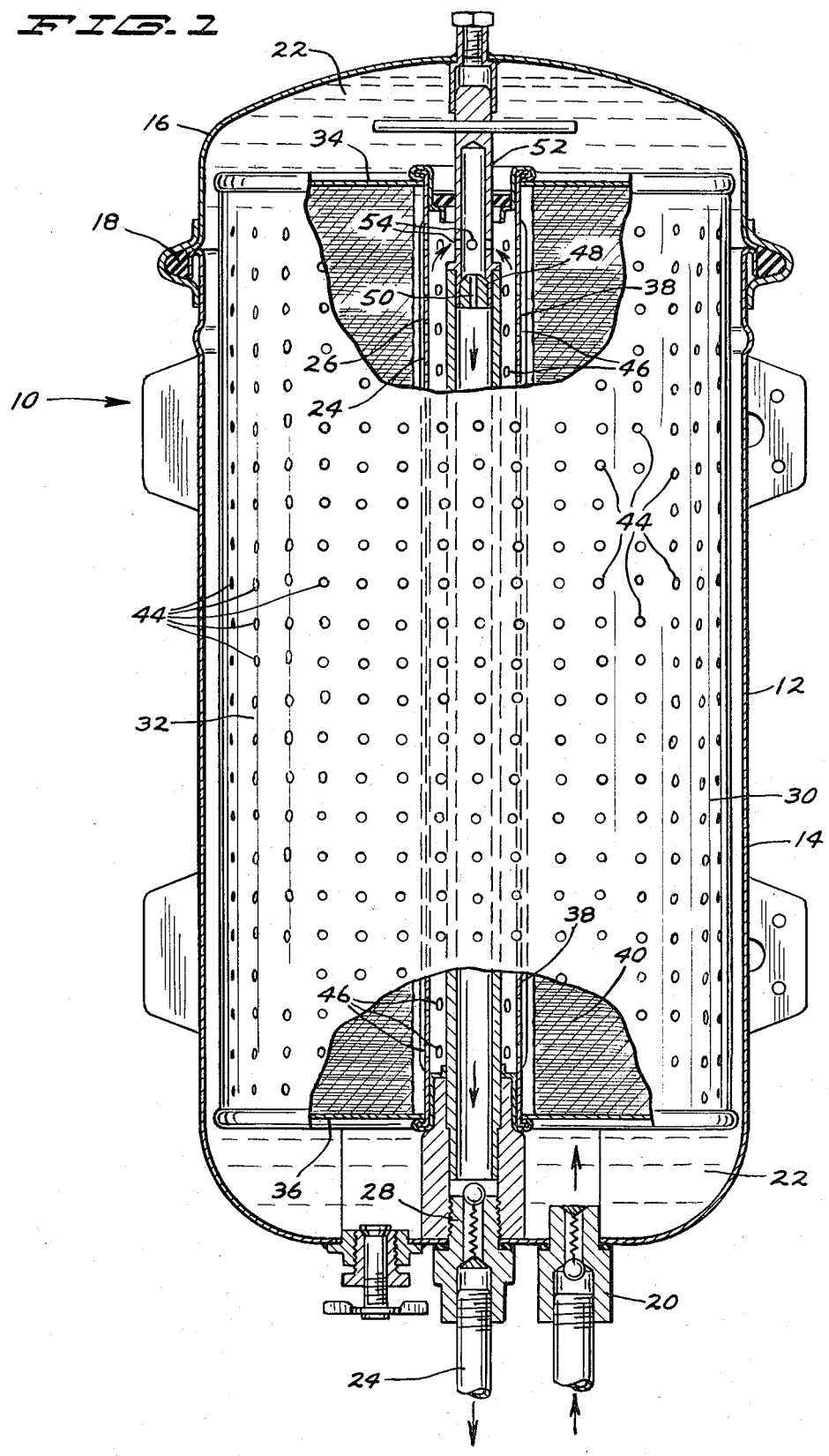
FIG. 1 is an elevational view of one form of filter unit of the present invention shown in relationship to a cross sectional view of a fluid clear cannister.
Figure 2:
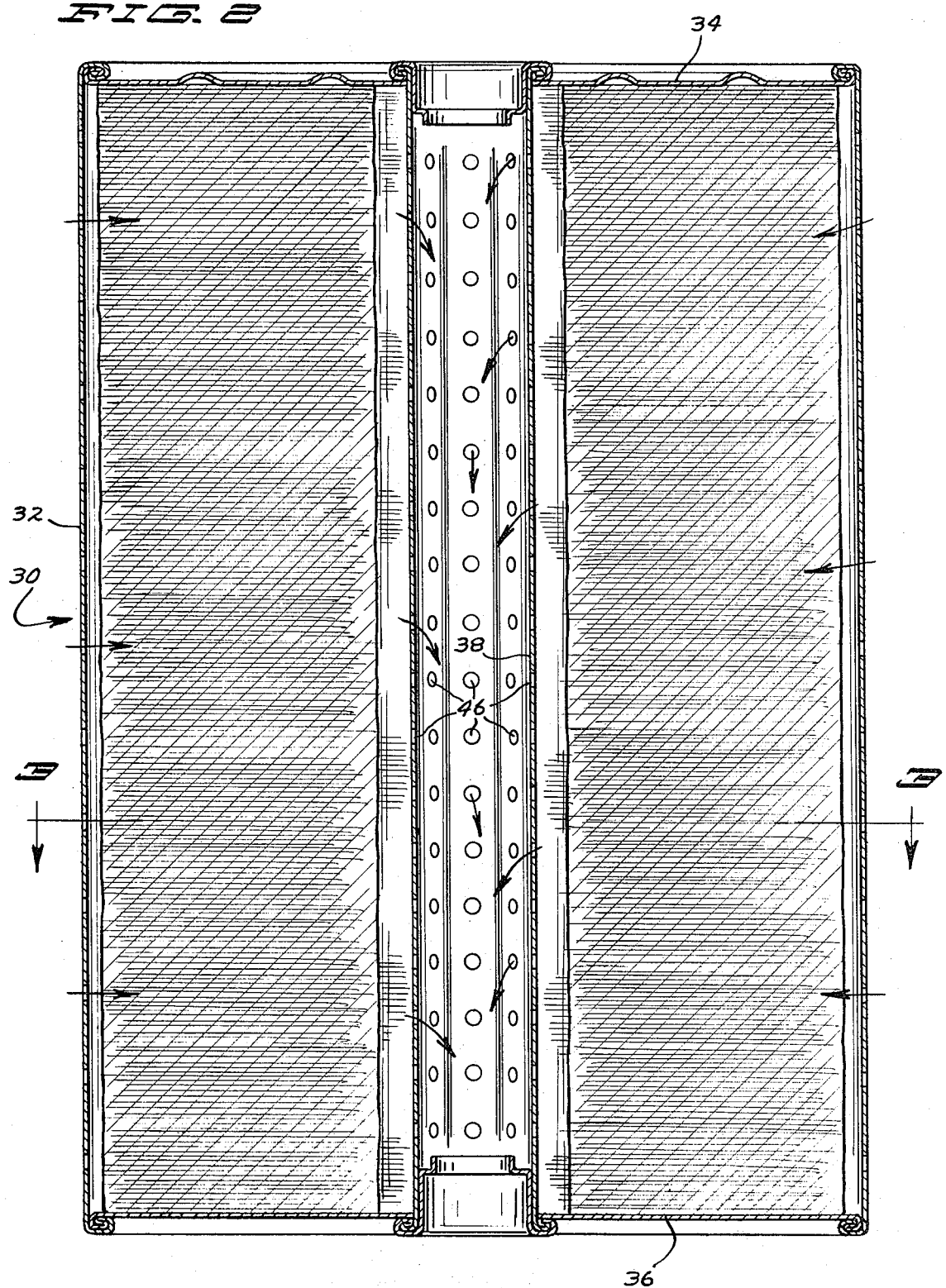
FIG. 2 is an enlarged vertical sectional view of the filter unit of FIG. 1 but showing a slightly different hole pattern in the outer casement of the filter unit.

Referring to FIGS. 1, 2 and 3, a fluid cleaner 10 includes a cylindrical cannister 12 having a bottom portion 14 and top portion 16 sealingly fastened to each other as at 18 in an usual or preferred manner. A fluid inlet pipe 20 opens through the bottom wall of the cannister to the interior thereof which is designated as the cannister chamber 22. A fluid outlet pipe 24 is open downwardly through the bottom wall of bottom portion 14 of cannister 12 and includes an upwardly extending portion 26 located in concentric relationship to the central longitudinal axis of the cannister 12, and a downwardly extending portion 28 which actually passes through the cannister wall to the outside. The foregoing elements of the fluid cleaner are well known and form a part of the prior art in which the novel filter unit of the invention operates. Filter units of the general outside and inside configurations such as seen in FIGS. 1 and 2 are likewise well known and form a part of the prior art, when these units are stuffed filter mediums such as sisal fibers, shredded newsprint, oat hulls, wood chips, papermache, charcoal, and other bulk materials.

A novel filter unit 30 of a first form of the present invention includes a cylindrical pervious outer casement 32 fixedly positioned to two flat disc-shaped impervious end plates 34 and 36, and a pervious generally cylindrical core 38, also sealingly fastened to the end plates 34 and 36. This much of the filter unit 30 is generally well known, but the control exerted over the fixing of the end plates to the core and to the outer casement forms an important consideration in regard to the present invention, as will be pointed out below.

The filter medium 40 extending from spaced relationship with respect to the inner cylindrical core 30 to terminate in spaced relationship to the casement 32 consists of a plurality of disc-shaped hollow filter papers 42 stacked in face to face relationship to each other. The shape of these papers can best be seen in FIG. 3. Many kinds and grades of filter paper will be useable with the invention, but paper of the grade, commonly referred to as toilet paper and/or facial tissue paper has been found most excellent for the purpose.

In use, the flow through the filter medium is from outside of the casement 32 through openings 44 therein through the filter medium "edgewise" of the stacked papers, and through openings 46 in the core 38.

It is to be understood that such a flow pattern can be established in a number of different ways, and that this flow pattern will be effective whether the fluid being cleaned is a liquid such as gasoline, diesel fuel, lubricating oil, drinking water, or the like, or whether it is a gas such as air, oxygen, carbon dioxide, or an air or other gaseous mixture in which finite particles of deleterious materials are entrained. The remainder of this specification will refer to the invention is connection with the filtration and cleaning of an oil such as an engine lubricating oil.

The flow of oil from the outside of the cannister, through the filter medium and the core, and out through the outlet pipe is achieved in the case of the structures illustrated herein by introducing the oil to be filtered through inlet pipe 20 into the cannister chamber 22 from whence it flows to the entire interior surface of the cannister, thus penetrating through the pervious outer casement 32 through all of the openings 44 therein. The differential in pressure between the oil flowing in the inlet pipe and the oil flowing out of the outlet pipe causes the oil to find its way through the filter medium, while being filtered of deleterious materials. From this point, the oil passes through the openings 46 into the core 38. Because the outlet pipe 24 is open to the inside of the core 38 only at a point but slightly separated from the top of the filter medium, all of the oil passing through the filter medium must pass out through the upper end of the upwardly extending portion 26 of that outlet pipe 24. A plug 48 having an orifice 50 therein is for the purpose of controlling the rate of flow of the oil through the entire system. It is to be noted that a plug 52 is situated in the top of the end plate 34 to prevent the passage of oil between the cannister chamber 22 and the interior of the core 38 without passing through the filter medium. Note further that this plug 52 is hollow at the lower end thereof and has openings 54 therein to allow passage of oil from inside of the core 38 to the inside of the upper portion of the outlet pipe 24.

Experience with earlier forms of filtration by "toilet paper" filters has taught that lubricating oil, for example, so filtered does not "break down" in the engine, and can be used almost indefinitely without changing because of the fact that the papers do not combine with the oil and add chemical combination products which are deleterious to the interior of the engine. What insoluble varnishes and like substances which do form in the engine oil during operation at a high temperatures are easily filtered out by the filter medium employed in this invention. Thus, under ideal circumstances, the "edgewise" filtration utilizing "toilet paper" type filters has provided the best solution to the problem. Heretofore, however, it has been impossible or at least economically impractical to provide sufficient filtering area to handle large filtration problems such as occur in industrial installations and/or in connection with mammoth or even simply large automotive vehicles. In other words, it has been impractical to utilize the well known "toilet paper roll" filtration system in any installations except those which have the substantially small volume per hour demand such as in light aircraft and/or in private automobiles.

Furthermore, even the "toilet paper roll" filtration of the prior art has proved unsatisfactory as far as insuring that the proper pressure between the paper layers was obtained to meet specific filtration problems. In general, where the material or substance to be filtered from a fluid flow is exceedingly fine, and the allowable pressure drop across the filter is relatively great, it is necessary that the pressure between adjacent layers of the filter paper be relatively high. Conversely, where the substances to be filtered out of the fluid are relatively gross and/or where the allowable drop across the filter must be kept to a minimum, the pressure between adjacent layers for satisfactory filtration must be relatively lower. With this increase and decrease of desirable pressure between layers there will be needed, often times, a commensurate decrease or increase in the effective area of filtration. This design control has not been possible before the present invention.

The filter units 30 of the present invention are designed and built initially to achieve optimum filtration under specific conditions. Through calculation or more usually through routine experimentation, the optimum filter surface is determined. This takes into account the outer diameter of the filter medium, the inner diameter of the core area of the medium, and the height of the stack of filter papers. Also determined by calculation and/or experimentation is the optimum pressure, or the range of permissible pressures under which the face to face filter papers are to be maintained. Once this is established, the proper size and number of filter papers are assembled onto the cylindrical core, after it has been fixedly mounted to the bottom disc 36, and after that disc has been mounted to the outer bottom edge of the outer casement 32. The top disc 34 is then set over the core 38 and the casement 32 and the end plate and core and disc are rolled into connection with one another so that the desired pressure will be obtained between the filter paper layers. Once the manufacturing techniques have been worked out, pressures well within the permissible variation can easily be obtained.

In filter units of the prior art, sophisticated openings which take the place of openings 44 in the casement must be made in such a way that the packed filter medium cannot escape. Thus, in a typical filter unit of the prior art, there is no way in which the operator can view the outer periphery of the filter medium to see whether or not it has become plugged with the deleterious materials which are being filtered out of the system. Even the present openings 44, while they afford some view of the exterior cylindrical surface of the filter medium, are not entirely satisfactory, so casements such as 60 in FIG. 4 and 70 in FIG. 5 have been provided with very large rectangular holes 62, and very large circular holes 72, respectively, through which the outer periphery of the filter medium can easily be inspected.

Referring now to FIG. 6, the ultimate in making the outer periphery of the filter medium visible has been achieved by omitting the casement entirely. This also results in a much less expensive structure than is shown in the other figures. For ease in understanding the disclosure FIG. 6, the parts which are identical in function with the parts shown in the other figures are similarly numbered but are 100 numbers higher.

The filter unit 130 of FIG. 6 employs a stiff upper end plate 134 and a stiff lower end plate 136, and the oil enters cannister chamber 122 from an inlet pipe 120, fills that chamber, and passes through the filter medium in the same manner as explained in connection with the first form of the invention, passing out through cylindrical core 138 through openings 146 provided therein. By providing a threaded adjusting nut 156 on the plugged end of inlet pipe 120, the proper tensioning on the face to face services of the filter paper can be obtained.

The embodiment of the invention in which an exclusive property or privilege is claimed are defined as follows:

1. The method of making a filter unit including the steps of:
   A. stacking a plurality of identically sized, flat sheets of toilet paper grade filter paper one on the other in face to face relationship to each other;
   B. placing impervious end plates of substantially the same shape as the individual sheets of filter paper in sealing relation to the end sheets of the stack;
   C. exerting a pressure on the outer surfaces of said plates to achieve a desired, predetermined pressure between adjacent filter paper sheets; and
   D. fastening these end plates with respect to each other to maintain the desired pressure between the filter paper sheets.

2. The method of claim 1 wherein said end plates are rigid, wherein said filter paper sheets are disc-shaped, having a circular opening therethrough; wherein a pervious generally cylindrical core member extends between the plates up through the interior opening and the filter paper sheets; and wherein the step of fastening the plates with respect to each other includes the fastening of each plate to said pervious core member.

3. The method of claim 2 wherein there is pervious casement extending between the plates, wherein the size and shape of the filter paper sheets is such as to substantially fill the cross sectional area of the casement but to be spaced from the interior surface of the casement; then wherein the step of fastening the two end plates with respect to each other includes fastening each of the end plates to the casement.

4. The method of claim 1 wherein there is a pervious casement extending between the end plates; wherein the end plates are rigid; and wherein the step of fastening the two plates in fixed relation to each other includes the fastening of each plate to the casement.

5. A filter unit for use in a fluid cleaner having a fluid tight outside cannister providing an open cannister chamber, an inlet pipe open from outside to the inside of the cannister, an outlet pipe having an inner end open from a central portion of said cannister chamber to the outside of said cannister; said filter unit including:

A. a plurality of identically sized flat sheets of toilet paper grade filter paper stacked one on the other in face to face relation;

B. a pair of impervious end plates of substantially the same size as the individual sheets of filter paper and each in sealing relation to an outer end of said sheets;

C. each of said sheets being provided with a central opening therein, said stacked sheets thereby defining a central core compartment, said end plates serving to seal said central core compartment from the remainder of said cannister chamber;

D. said outlet pipe extending through one of said end plates into said central core compartment in sealing relation to said end plate; and E. means for fixedly positioning said end plates with respect to each other to achieve a desired predetermined pressure between the individual sheets of filter paper.

6. The combination of claim 5 wherein said sheets of filter paper are disc-shaped in configuration and said central opening therein is in concentric alignment with the outer surface of said sheets, thus to provide a substantially cylindrical core compartment in concentric relationship to a provided cylindrical outer surface of the filter unit of stacked sheets of filter paper.

7. The combination of claim 6 and a substantially cylindrical pervious core extending from end plate to end plate within the core compartment, said inner end of said outlet pipe being open to the inside of said pervious core.

8. The combination of claim 7, and a pervious cylindrical casement extending from end plate to end plate in sealing relation thereto.

9. The combination of claim 8 wherein said pervious casement is provided with holes or openings of a size sufficiently large to allow easy visual inspection of any filtered particles or materials which have been deposited on the outer cylindrical surface of the filter medium.

* * * * *

UNITED STATES PATENT OFFICE
CERTIFICATE OF CORRECTION

PATENT NO. : 3,868,327
DATED : February 25, 1975
INVENTOR(S) : James F. Van Gilder et al It is certified that error appears in the above-identified patent and that said Letters Patent are hereby corrected as shown below:

Column 2, line 14, "device" should be --devices--.

Column 2, line 41, "mater" should be --material--.

Column 3, line 5, "fltering" should be --filtering--.

Column 3, line 48, "clear" should be --cleaner--.

Column 4, line 3, "an" should be --any--.

Column 5, line 28, before "high" omit "a"

Claim 3, line 1, after "is" insert --a--.

Signed and sealed this 1st day of July 1975.

(SEAL)
Attest:

RUTH C. MASON
Attesting Officer

C. MARSHALL DANN
Commissioner of Patents
and Trademarks